United States Patent [19]
Dey

[11] Patent Number: 5,857,214
[45] Date of Patent: Jan. 5, 1999

[54] MICROPROCESSOR WITH A FIXED CACHE SIZE SELECTED FROM A PREDESIGNED SET OF SIZES

[75] Inventor: Shankar Dey, San Jose, Calif.

[73] Assignee: Advanced Micro Devices, Inc., Sunnyvale, Calif.

[21] Appl. No.: 852,706

[22] Filed: May 7, 1997

Related U.S. Application Data

[63] Continuation of Ser. No. 574,048, Dec. 18, 1995, abandoned.

[51] Int. Cl.$^6$ ........................................................ G06F 12/08
[52] U.S. Cl. .......................... 711/212; 711/211; 711/172; 711/3
[58] Field of Search ................................ 711/3, 202–212, 711/170–172, 128, 129

[56] References Cited

U.S. PATENT DOCUMENTS

| | | | |
|---|---|---|---|
| 4,315,312 | 2/1982 | Schmidt | 711/172 |
| 5,276,632 | 1/1994 | Holman, Jr. | 711/3 |
| 5,367,653 | 11/1994 | Coyle et al. | 711/128 |
| 5,423,019 | 6/1995 | Lin | 711/135 |
| 5,586,303 | 12/1996 | Willenz et al. | 711/172 |

FOREIGN PATENT DOCUMENTS

| | | |
|---|---|---|
| 4-134523 | 5/1992 | Japan . |

OTHER PUBLICATIONS

Drude, Northgate SlimLine ZXP 266 maintains a low profile, Computer Shopper, v13, n1, p. 452(2)., Jan. 1993.

Bass et al., PA 7100LC microprocessor: a case study of IC design decisions in a competitive environment, Hewlett–Packard Journal, v46, n2, p. 12–22., Apr. 1995.

Caching Disk Controller Upgrades PC at Power, News Release, p. 1., Aug. 29, 1988.

Warren Andrews, New Cache tags bring flexibility, performance to memory subsystems, Computer Design, v29, n13, p. 42(s)., Jul. 1, 1990

Leonard et al., Cache controllers flare memory bottleneck, Electronic Design, v36 n8, p. 25(6)., Mar. 31, 1988.

Bannon et al., Today's microprocessors aim for flexibility, Electronic Engineering Times, n822, p. 68., Nov. 7, 1994.

*Primary Examiner*—Matthew M. Kim
*Attorney, Agent, or Firm*—H. Donald Nelson

[57] ABSTRACT

A microprocessor chip having a selectable size cache. The selection is accomplished by cache size logic fabricated on the chip. The cache size logic includes a cache size logic register with output select lines that are set by the designer. The select lines control the output of multiplexors that communicate either a "0" or the contents of selected bits of a virtual address register which receives the virtual address from the CPU to either a tag field register or an address field register.

4 Claims, 8 Drawing Sheets

Cache Size 4K Bytes

Cache Size 512 Bytes

MICROPROCESSOR WITH A FIXED CACHE SIZE SELECTED FROM A PREDESIGNED SET OF SIZES

This application is a continuation of application Ser. No. 08/574,048, filed Dec. 18, 1995, now abandoned.

BACKGROUND OF THE INVENTION

1. Field of the Invention

This invention relates generally to microprocessor chips having caches and, more particularly, to microprocessor chips having a selectable size cache.

2. Discussion of the Related Art

A cache memory is a small, fast memory which is designed to store the most frequently accessed words from a larger, slower memory. The concept of a memory hierarchy with a cache as part of the hierarchy has been associated with the computer art from the earliest discussions of computer design. The idea of a memory hierarchy, with memory speed and memory size being the tradeoff, was discussed in John von Neumann's report on the design of the EDVAC (Electronic Discrete Variable Automatic Computer), which was written in the mid-1940s. The necessity for a cache with faster memory became more apparent because of the competition for the communication channel, which has become known as the "von Neumann bottleneck." This bottleneck and the inherent slowness of large memory components such as disk or tape drives became even more critical in the early 1960s when CPU (central processing unit) speeds could exceed memory speeds by a factor of 10. This factor has become even more critical as CPU speeds have increased by orders of magnitude over the increase in speed of memory since the 1960s.

Early studies and efforts to increase the speed and performance of computers revealed a principle that applied to computer programs called the principle of locality which has enhanced the need for caches and the value of caches in the design and operation of computers. The principle of locality states that programs access a relatively small portion of their address space at any instant of time. There are two different types of locality: (1) temporal locality (locality in time) which states that if an item is referenced, it will tend to be referenced again soon and (2) spatial locality (locality in space) which states that if an item is referenced, items in memory with close addresses will tend to be referenced soon. The design, implementation, and use of a memory hierarchy takes advantage of the principle of locality. A major consideration in the design of a memory hierarchy is that the fastest memories are more expensive per bit than the slower memories. Main memory is implemented using DRAM (dynamic random access memory) chips, while levels closer to the CPU, such as caches, use SRAM (static random access memory) chips. DRAM is less costly per bit than SRAM; however, it is substantially slower. The price difference arises because DRAM uses fewer transistors per bit of memory and, thus, DRAMs are less expensive to manufacture. Another factor in the design of memory systems is that SRAM use more silicon area for the same memory capacity.

Because of the differences in cost and access time, it is advantageous to implement a computer architecture with the memory built as a hierarchy of levels with the faster memory close to the microprocessor and the slower, less expensive memory further away from the microprocessor. The goal has been to present the users with as much memory as possible in the least expensive technology, while providing the speed required by the application. This tradeoff between cost and speed and, thus, performance is one of the major considerations in computer system design.

The three major technologies used to construct memory hierarchies are SRAM, DRAM, and magnetic disk. The access time and price per bit vary widely among these technologies as the table below indicates (using values typical for 1993):

| Memory Technology | Typical access time | $ per MByte |
| --- | --- | --- |
| SRAM | 8–35 ns | $100–$400 |
| DRAM | 90–120 ns | $25–$50 |
| Magnetic Disk | 10,000,000–20,000,000 ns | $1–$2 |

It is clear from an examination of the values in the above table that a computer system design that incorporates unneeded or underutilized SRAM in a cache has a higher cost than required. On the other hand, too little SRAM in a cache will provide a lower cost device but at the expense of speed. It has been the tendency in the prior art to design a computer system with a microprocessor having a standard cache sized to meet the needs of a broad spectrum of users without regard to the specific use for which the microprocessor is to be used. Generic designs were used since design costs are high. But a microprocessor designed with a standard cache size is difficult to effectively fit into a price-performance requirement for a given application or a market. On the other hand, it is too expensive, in terms of design and development costs, to design a separate microprocessor for each price-performance demand of the market. Since the performance of a microprocessor depends upon the cache size and cache parameters, it is desirable to be able to produce microprocessors of varying levels of performance and size from the same basic design without the associated high cost of each individual new design effort.

What is needed is a design which will allow the designer to select a cache size which is optimum, in terms of a mix between cost and performance, for a target market. The designer should be able to consider factors such as the size of application programs that will likely be used, the number of different application programs that will likely be used, the necessity for speed, and the cost constraints of the system. The optimum solution would be for the designer to be able to change the cache size by making minimal changes to a basic design in order to easily create a new version of the basic design.

SUMMARY OF THE INVENTION

A microprocessor chip having a cache size logic. The cache size logic allows the size of the cache to be selected with minimal design effort. The cache size logic includes a virtual address register to receive a virtual address from the CPU and, depending upon what size cache is selected, communicates selected bits from the virtual address register to a tag field register and an address register which are in turn communicated to the cache.

The cache size logic includes connectors between selected bits in the virtual address register and, depending upon what size cache is selected, will communicate either a "0" or the contents of the selected bits in the virtual address register to either the tag field register or the address field register.

Each connector from a selected bit in the virtual address register includes a pair of multiplexors to output either a "0" or the contents of the selected bit in the virtual address register, depending upon the value of a select line input to each multiplexor.

The cache size logic includes a cache size select register with select lines to each multiplexor. The cache size select register is programmable.

The present invention is better understood upon consideration of the detailed description below in conjunction with the accompanying drawings. As will become readily apparent to those skilled in this art, the following description shows and describes an embodiment of this invention simply by way of illustration of the best mode to carry out the invention. As it will be realized, the invention is capable of other embodiments and its several details are capable of modifications in various obvious aspects, all without departing from the scope of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate the present invention and, together with the description, serve to explain the principles of the invention. In the drawings.

DETAILED DESCRIPTION OF THE PREFERRED EMBODIMENT

Figure 1:
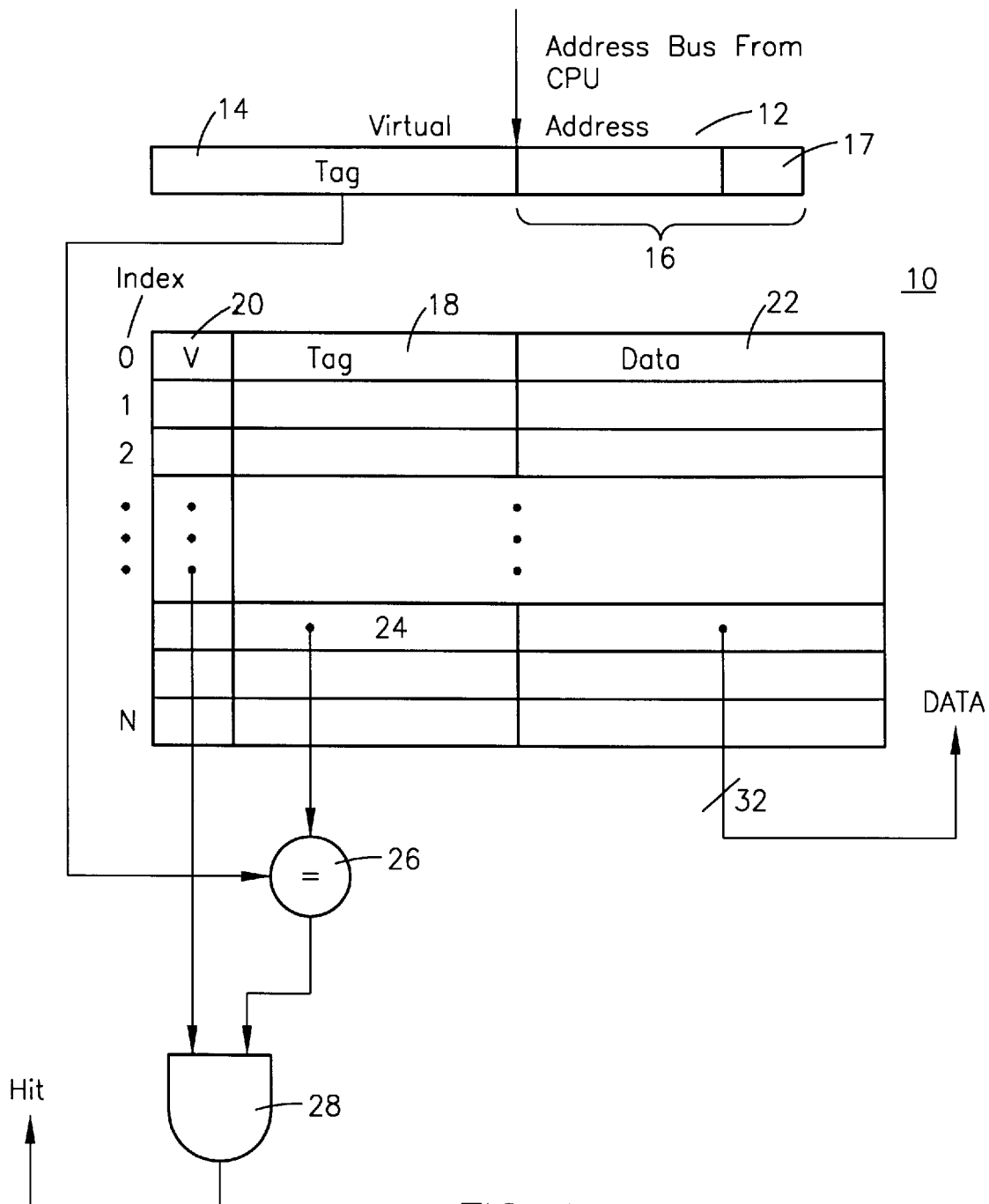
FIG. 1 depicts a cache as utilized in the prior art.

FIG. 1 depicts the relationship of a cache 10 with a virtual address register 12 that receives a virtual address generated by the CPU (not shown). In this disclosure a bus size of 32 bits will be described; however, it should be understood that the scope of this invention is not restricted to a bus size of 32 bits. Because we are describing a 32 bit bus size machine; it will be understood that the virtual address register 12 is 32 bits wide. Shown in the virtual address register 12 is a tag field 14, an address field 16, and a byte offset field 17. It will be understood that the size of the tag field 14 and the size and content of the address field 16 are dependent upon the size of the cache and the kind of cache, i.e., whether the cache is a direct address cache, a fully associative, or an x-way set associative, where x can be values such as 2, 3, or 4, etc. It is also to be understood that the address field 16 is made up of different sections, i.e., an index, byte select bits, etc., also dependent upon the type of cache used. It will be understood from the description that this invention comprehends any type of cache and that the address field 16 is not affected by this invention except for a certain number of most significant bits.

Referring again to FIG. 1, cache 10 has a tag field 18, a valid bit field 20, and a data field 22. For example, if it is assumed that cache 10 is a 1K Byte direct mapped cache, part of the lower portion of the virtual address (the index) is used to select a cache entry which includes a data word and a tag. The tag from the cache represented at 24 is compared in comparator 26 to the contents of tag field 14 in virtual address register 12, to determine whether the entry in the cache corresponds to the requested address. The output of comparator 26 is ANDed by an AND gate 28 with the contents of the valid bit field 20, and if both are true, i.e., the tags match and the valid bit is true, there is a cache "hit" and the selected byte in the data field is forwarded as directed by the CPU. Because in this example the cache has $2^{10}$ or 1024 32-bit words (1K 32-bit words) and a block size of 1 32-bit word, 10 bits are needed to index the cache, leaving 32–10–2=20 bits to be compared against the tag where 32 represents the bus size, 10 represents the index size, and 2 represents the size of the byte offset 17. The value 2 is obtained because the data size is 1 32-bit word which equals 4 bytes. Alternatively, if there is a cache "miss," the requested data is fetched from memory, sent to the CPU, and placed in the data portion of the cache while the upper bits of the address are placed in the tag field and the valid bit is turned on.

Figure 2:
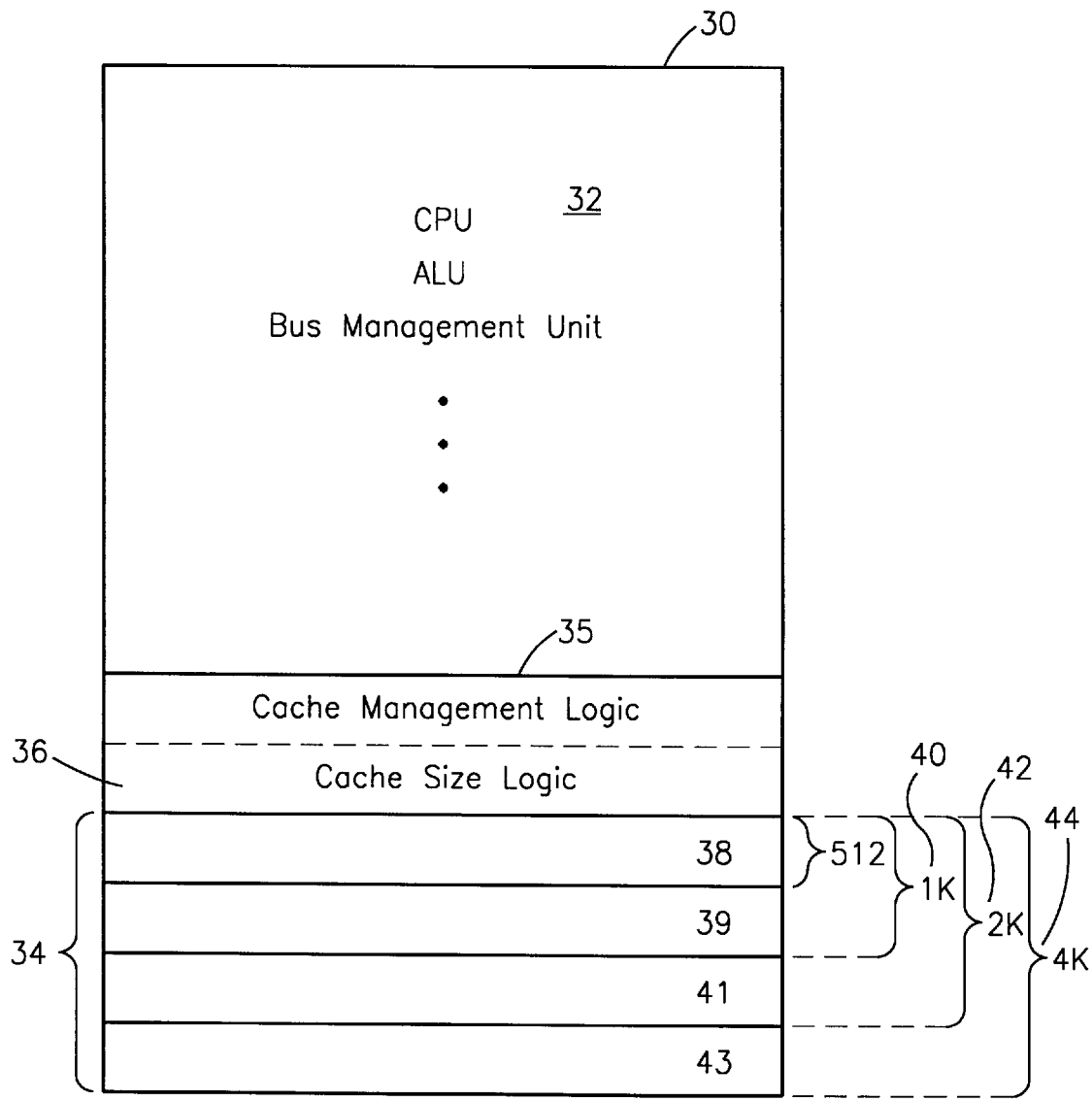
FIG. 2 is a conceptual depiction of a microprocessor chip with an enlarged view of the cache size logic section and the various size cache portions as described in the present application.

FIG. 2 depicts a conceptual representation of the present invention. Shown is a representation of a microprocessor chip 30 with a CPU, an ALU, and other components that may be found on a microprocessor chip, indicated at 32. Also shown is a cache 34 and a cache management unit 35 which further includes cache size logic 36 which will be described in more detail later. Illustrated is a first section 38 of cache 34 with a size of 512 Bytes, a second section 40 of cache 34 with a size of 1K Bytes (as known in the computer art, the size of 1024 Bytes is referred to as 1K Bytes. In this description, the practice of referring to 1024 Bytes as 1K Bytes and 2048 Bytes as 2K Bytes will be followed; however, it will be understood that the actual values are represented by $2^{10}$=1024=1K, $2^{11}$=2048=2K, etc.), a third section 42 of cache 34 with a size of 2K Bytes, and a fourth section 44 of cache 34 with a size of 4K Bytes. It is to be understood that the values of 512 Bytes, 1K Bytes, 2K Bytes, and 4K Bytes are representative only and other sizes could be chosen. For example, other selectable cache sizes such as 1K Bytes, 2K Bytes, 4K Bytes, and 8K Bytes could be used as well as the sizes used as illustrative of the present invention. The only real constraint in the choice of selectable cache sizes is that they be sized by $2^N$, $2^{N+1}$, $2^{N+2}$, etc., where N is an integer. The second section 40 of cache 34 is made up of cache portions 38 and 39. The third section 42 of cache 34 is made up of cache portions 38, 39, and 41. The fourth section 44 of cache 34 is made up of cache portions 38, 39, 41, and 43. When the designer determines that a cache size of 512 Bytes is desired, the cache size logic is adjusted (to be described later) and only cache portion 38 is fabricated. Similarly, if the designer determines that a cache size of 2K Bytes is desired, the cache size logic is adjusted and cache portions 38, 39, and 41 are fabricated. For illustrative purposes, a cache size selection of 512 Bytes, 1K Bytes, 2K Bytes, and 4K Bytes is discussed. For a cache size of 512 Bytes, since $2^9$=512 Bytes, the address field must be 9 bits and the tag field must then be 32–9=23 bits. Similarly, for a cache size of $2^{10}$=1K Bytes, the address field must be 10 bits and the tag field must then be 32–10=22 bits. For a cache size of 2K Bytes, ($2^{11}$=2K), the address field must be 11 bits and the tag field must then be 32–11=21 bits, and for a cache size of 4K Bytes ($2^{12}$=4K), the address field must be 12 bits and the tag field must then be 32–12=20 bits.

Therefore, to accommodate a selection of 512 Bytes, 1K Bytes, 2K Bytes, and 4K Bytes, it must be possible to adjust the size of the address field from 9 bits to 12 bits and to be able to adjust the tag field from 23 to 20 bits.

Figure 3:
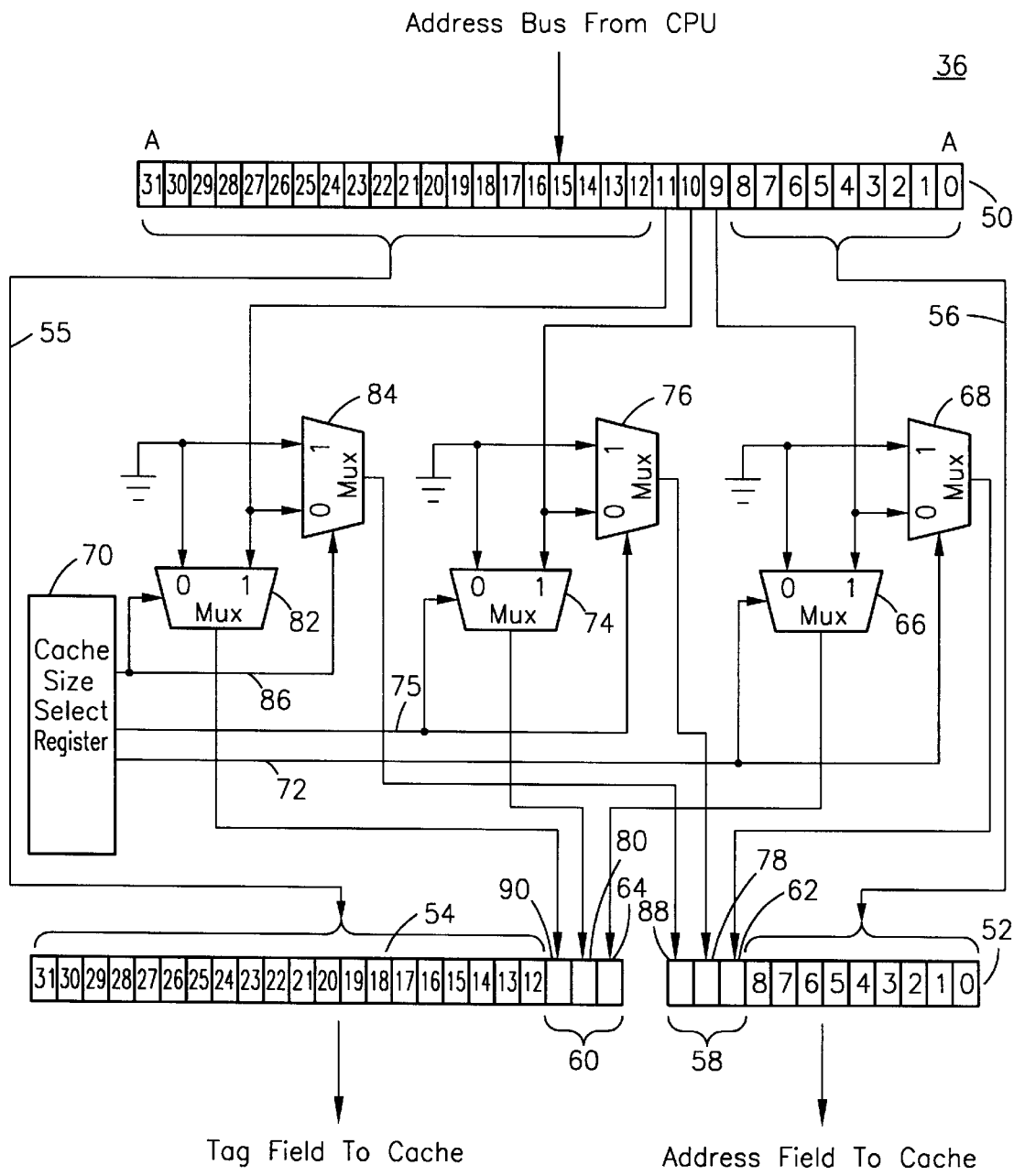
FIG. 3 depicts the cache size logic of the present invention.

FIG. 3 shows a virtual address register 50 with each bit location numbered from A0 to A31 (a 32 bit register). There is shown an address field 52 and a tag field 54. Virtual address register 50 receives a 32 bit virtual address from the CPU (not shown) and the contents of the tag field 54 and address field 52 are communicated to the cache (not shown in this figure). For the cache size to be selectable between 512 Bytes and 4K Bytes, as discussed above, the number of bits in tag field 54 and in address field 52 must be adjustable. (Tag field 54 and address field 52 in FIGS. 3–8 correspond to tag field 14 and address field 16 in FIG. 1.) As indicated at 56, the contents of bit locations A0–A8 in virtual address register 50 are communicated directly to address field register 52 and placed in bit locations 0–8, respectively. Similarly, the contents of bit locations A12–A31 in virtual address register 50 are communicated directly to tag field register 54 as indicated at 55 and placed in bit locations 12–31, respectively. The numerals in the bit locations in tag field register 54 and address field register 52 indicate that the contents of each bit location corresponds to the content of the bit locations in virtual address register 50 having like numerals. Depending upon the size of the cache selected, the contents of bit locations 9, 10, and 11 in virtual address register 50 are communicated individually to one of the three most significant bit locations of address field register 52 indicated at 58 or to one of the three least significant bit locations of tag field register 54 indicated at 60.

The operation of the cache size logic is now described. Still referring to FIG. 3, the contents of bit location A9 in virtual address register 50 is communicated to either bit location 62 in address field register 52 or to bit location 64 in tag field register 54. This is accomplished by connecting bit location A9 in virtual address register 50 to a pair of multiplexors 66 and 68 connected such that the output from each is controlled by a select bit from cache size select register 70. For example, if select line 72 carries a value of 1, multiplexor 68 will communicate a binary zero, indicated by a "0" to bit location 62 in address field register 52 and multiplexor 66 will communicate the value contained in bit location A9 of virtual address register 50 to bit location 64 of tag field register 54. Alternatively, if select line 72 carries a value of 0, multiplexor 68 will communicate the value contained in bit location A9 of virtual address register 50 to bit location 62 of address field register 52, and multiplexor 66 will communicate a "0" to bit location 64 of tag field register 54. Similarly, multiplexors 74 and 76 selectively communicate, according to the value of select line 75, either a "0" or the value contained in bit location A10 in virtual address register 50 to either bit location 78 in address field register 52 or to bit location 80 in tag field register 54. Multiplexors 82 and 84 selectively communicate, according to the value of select line 86, either a "0" or the value contained in bit location A11 in virtual address register 50 to either bit location 88 in address field register 52 or to bit location 90 in tag field register 54. As can be appreciated, merely selecting the value of select lines 72, 75, and 86 allows the designer to control what values are contained in the three bit locations 60 of tag field register 54 and in the three bit locations 58 of address field register 52.

Figure 4:
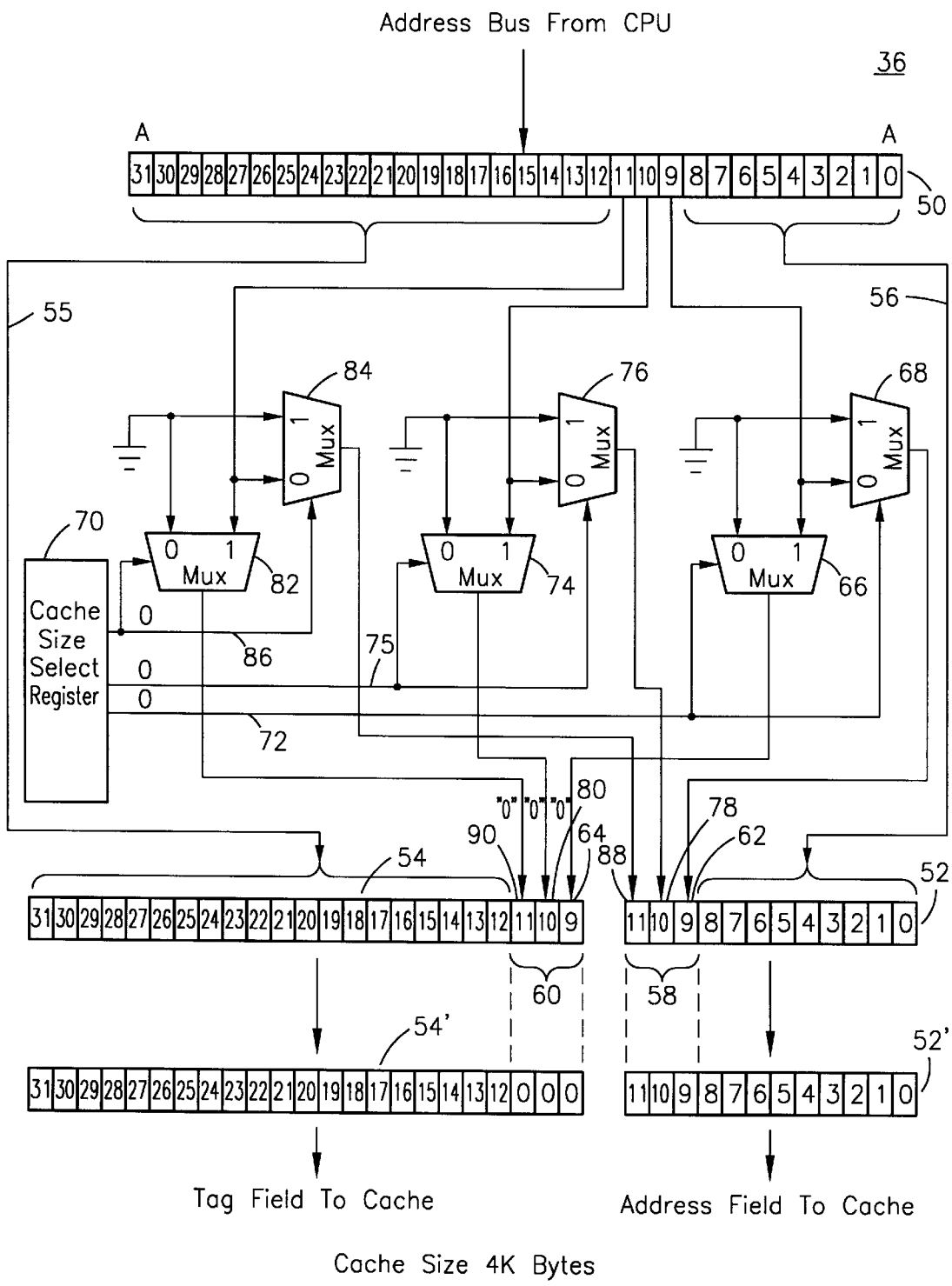
FIG. 4 depicts the cache size logic with a 4K Byte cache selected.

FIG. 4 shows the configuration of the present invention when a cache size of 4K Bytes is selected. To select a cache size of 4K Bytes, the designer causes select lines 72, 75, and 86 from cache size select register 70 to have the value 0. A value 0 on select line 72 causes multiplexor 68 to communicate the contents of bit location A9 in virtual address register 50 to bit location 62 in address register 52. At the same time a value of 0 on select line 72 causes multiplexor 66 to communicate a "0" to bit location 64 in tag field register 54. Similarly, a value of 0 on select line 75 causes the contents of bit location A10 in virtual address register 50 to be communicated to bit location 78 in address field register 52 and causes multiplexor 74 to communicate a "0" to bit location 80 in tag field register 54. A value of 0 on select line 86 causes multiplexor 84 to communicate the contents of bit location A11 in virtual address 50 to bit location 88 in address field register 52. For illustrative purposes only, tag field register 54 is redrawn at 54' and address field register is redrawn at 52', and both are shown with the values as communicated from virtual address register 50.

Figure 5:
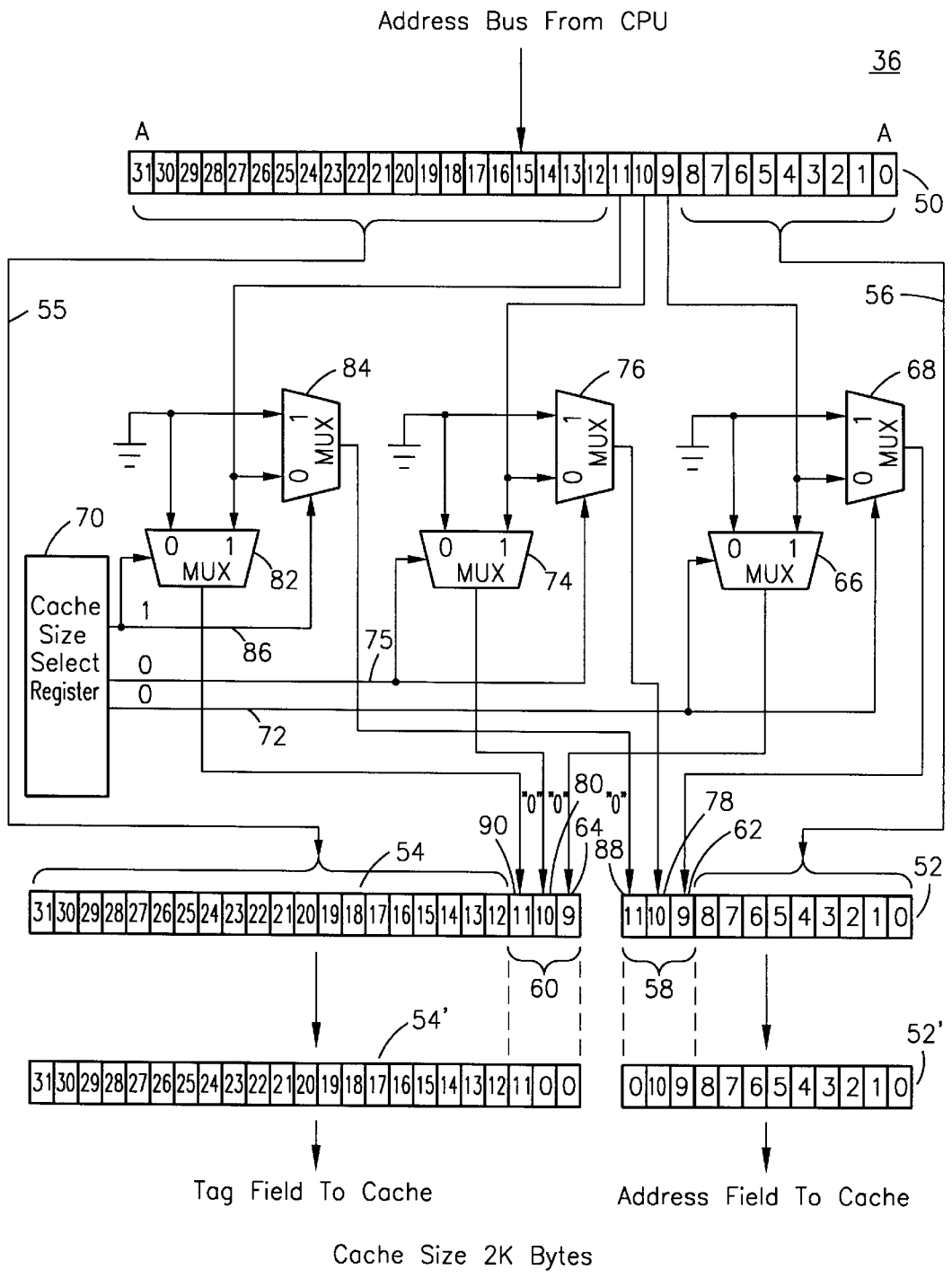
FIG. 5 depicts the cache size logic with a 2K Byte cache selected.

FIG. 5 shows the configuration of the present invention when a cache size of 2K Bytes is selected. To select a cache size of 2K Bytes the designer causes select lines 72 and 75 from cache size select register 70 to have value 0. Select line 86 is caused to have a value of 1. This selection of values causes the contents of bit locations A9 and A10 in virtual address register 50 to be communicated to bit locations 62 and 78, respectively, in address field register 52, and the contents of bit location A11 in virtual address register 50 to be communicated to tag field register 54. This selection of values on select lines 72, 75, and 86 causes "0"s to be communicated to bit locations 64 and 80 in tag field register 54 and bit location 88 in address field register 52. For illustrative purposes only, tag field register 54 is redrawn at 54' and address field register 52 is redrawn at 52', and both are shown with the values as communicated from virtual address register 50.

Figure 6:
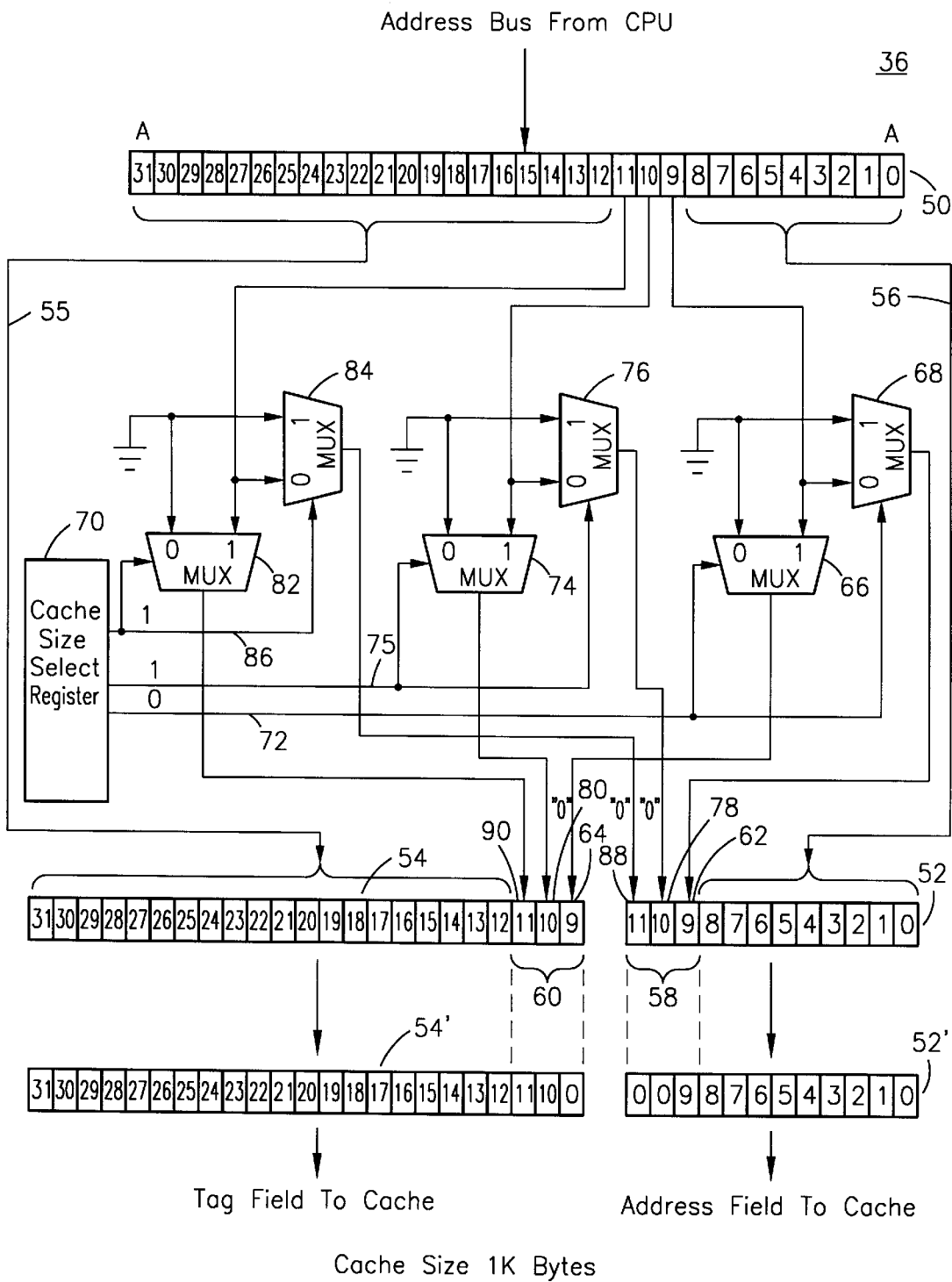
FIG. 6 depicts the cache size logic with a 1K Byte cache selected.

FIG. 6 shows the configuration of the present invention when a cache size of 1K Bytes is selected. To select a cache size of 1K Bytes, the designer causes select lines 75 and 86 from cache size select register 70 to have the value 1 and select line 72 to have the value 0. This selection of select line values causes the contents of bit locations A10 and A11 in virtual address register 50 to be communicated to bit locations 80 and 90, respectively, in tag field register 54 and the content of bit location A9 in virtual address register 50 to be communicated to bit location 62 in address field register 52. This selection of values on select lines 72, 75, and 86 causes "0"s to be communicated to bit locations 78 and 88 in address field register 52 and to bit location 64 in tag field register 54. For illustrative purposes only, tag field register 54 is redrawn at 54' and address field register 52 is redrawn at 52', and both are shown with the values as communicated from virtual address register 50.

Figure 7:
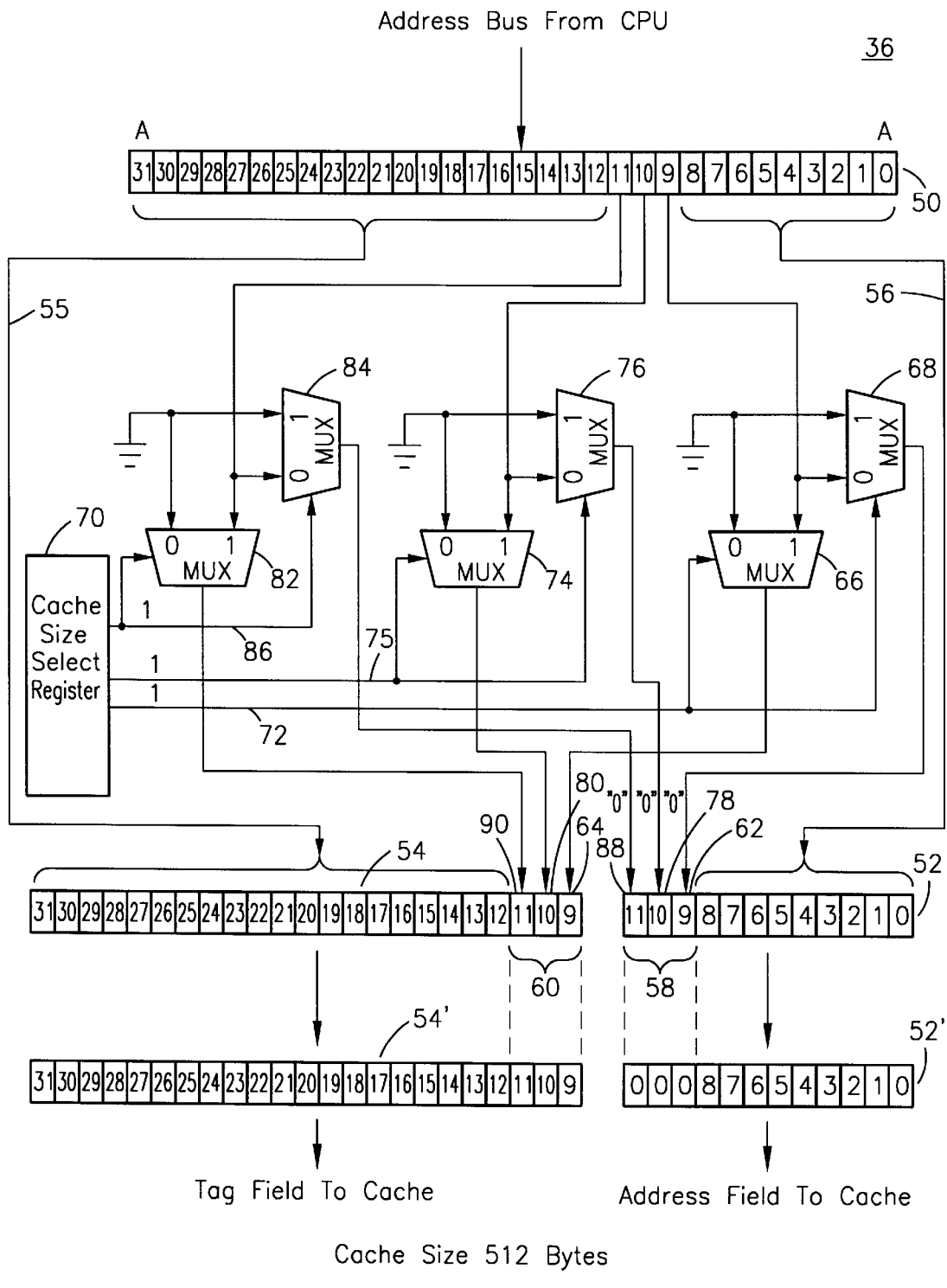
FIG. 7 depicts the cache size logic with a 512 Byte cache selected.

FIG. 7 shows the configuration of the present invention when a cache size of 512 Bytes is selected. To select a cache size of 512 Bytes the designer causes select lines 72, 75, and 86 from cache size select register 70 to have the value 0. This selection of values cause the contents of bit locations A9, A10, and A11, to be communicated to bit locations 64, 80, and 90, respectively, in tag field register 54. This selection of values on select lines 72, 75, and 86 causes "0"s to be communicated to bit locations 62, 78, and 88 in address field register 52. For illustrative purposes only, tag field register 54 is redrawn at 54' and address field register 52 is redrawn at 52', and both are shown with the values as communicated from virtual address register 50.

Figure 8:
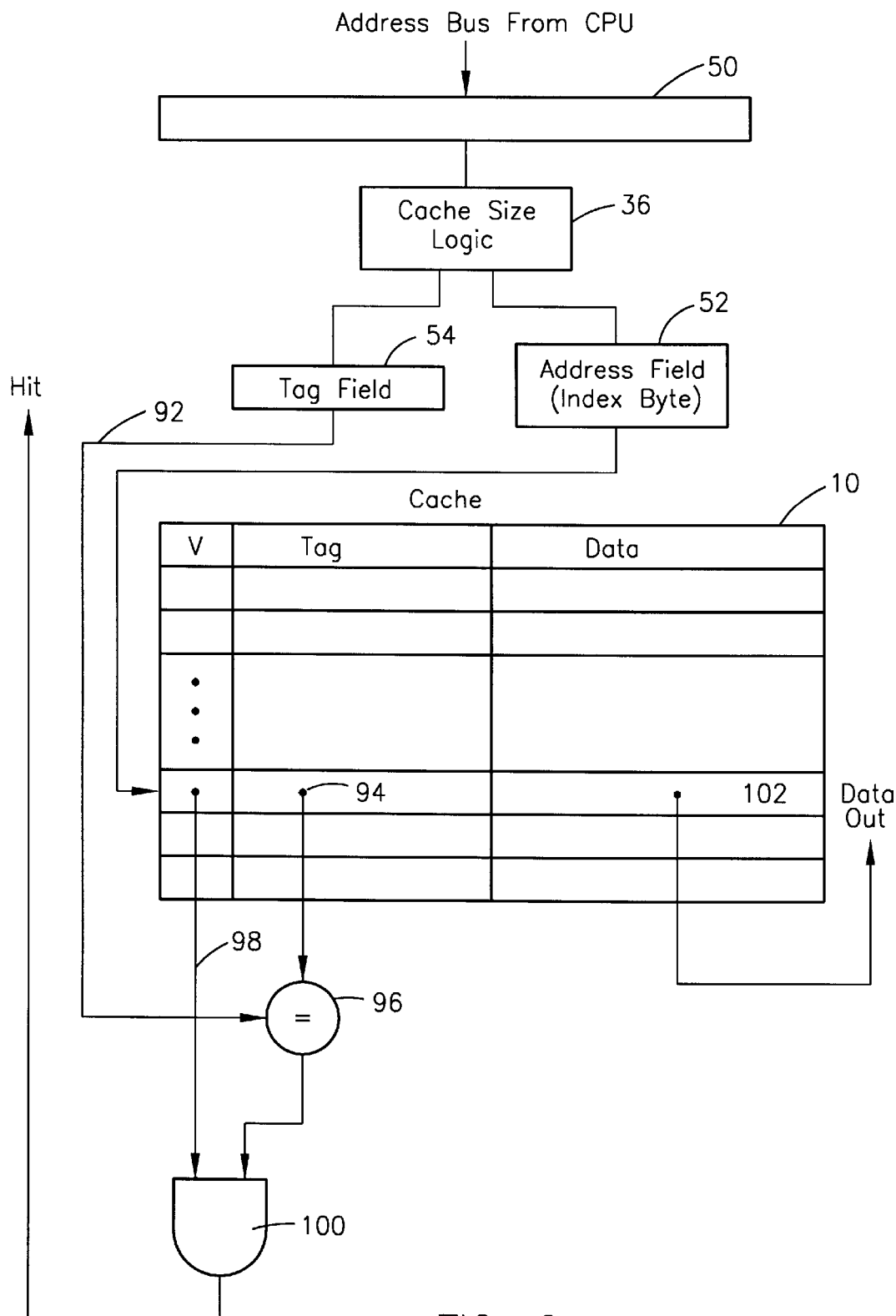
FIG. 8 shows the relationship of the present invention as disposed between the CPU and cache.

FIG. 8 shows the relationship of cache size logic 36, tag field register 54, and address field register 52 with virtual address register 50 and cache 10 (like numerals are used for like components from FIG. 1). The cache resulting from the present invention is transparent to the user; that is, it functions the same way as the prior art devices with the exception that the size can be selected by the designer and the cache size logic 36 adjusts the contents of the tag field register 54 and the address field register 52. The tag from tag field register 54 represented at 92 is compared with the tag from cache 10 represented at 94 in comparator 96. If true, i.e., if the tags match and the valid bit 98 is true, AND gate 100 will indicate a cache "hit" and the data 102 will be sent to the CPU (not shown).

The foregoing description of the preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principle of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What I claim is:

1. A microprocessor chip having a CPU, comprising:

a fixed size cache wherein the size is selected from a predesigned set of sizes: and cache size logic having an output to coincide with the fixed size cache selected from the predesigned set of sizes;

said cache size logic comprises:

a virtual address register receiving a virtual address from the CPU via an address bus;

a second register having a variable size tag field with at least one least significant bit and a variable size address field having at least one most significant bit; and a cache size select register controlling at least one connector between a selected bit in the virtual address register and the at least one least significant bit in the tag field register and at least one most significant bit in the address field register.

2. The microprocessor chip of claim 1 wherein said at least one connector comprises a pair of multiplexors each having two inputs and each having a select line from the cache size select register to select one of said two inputs to be an output.

3. The microprocessor chip of claim 2, wherein the output of each of said multiplexors is selected to either communicate a content of said selected bit in said virtual address register to said at least one least significant bit in said tag field register and to communicate a zero to said at least one most significant bit in said address field register or to communicate a zero to said one least significant bit in said tag field register and to communicate the content of said selected bit in said virtual address register to said at least one most significant bit in said address field register.

4. The microprocessor chip of claim 3 further comprising:

a bus to communicate a content of said tag field register to the cache; and a bus to communicate a content of said address field register to the cache.

* * * * *